UNITED STATES PATENT OFFICE.

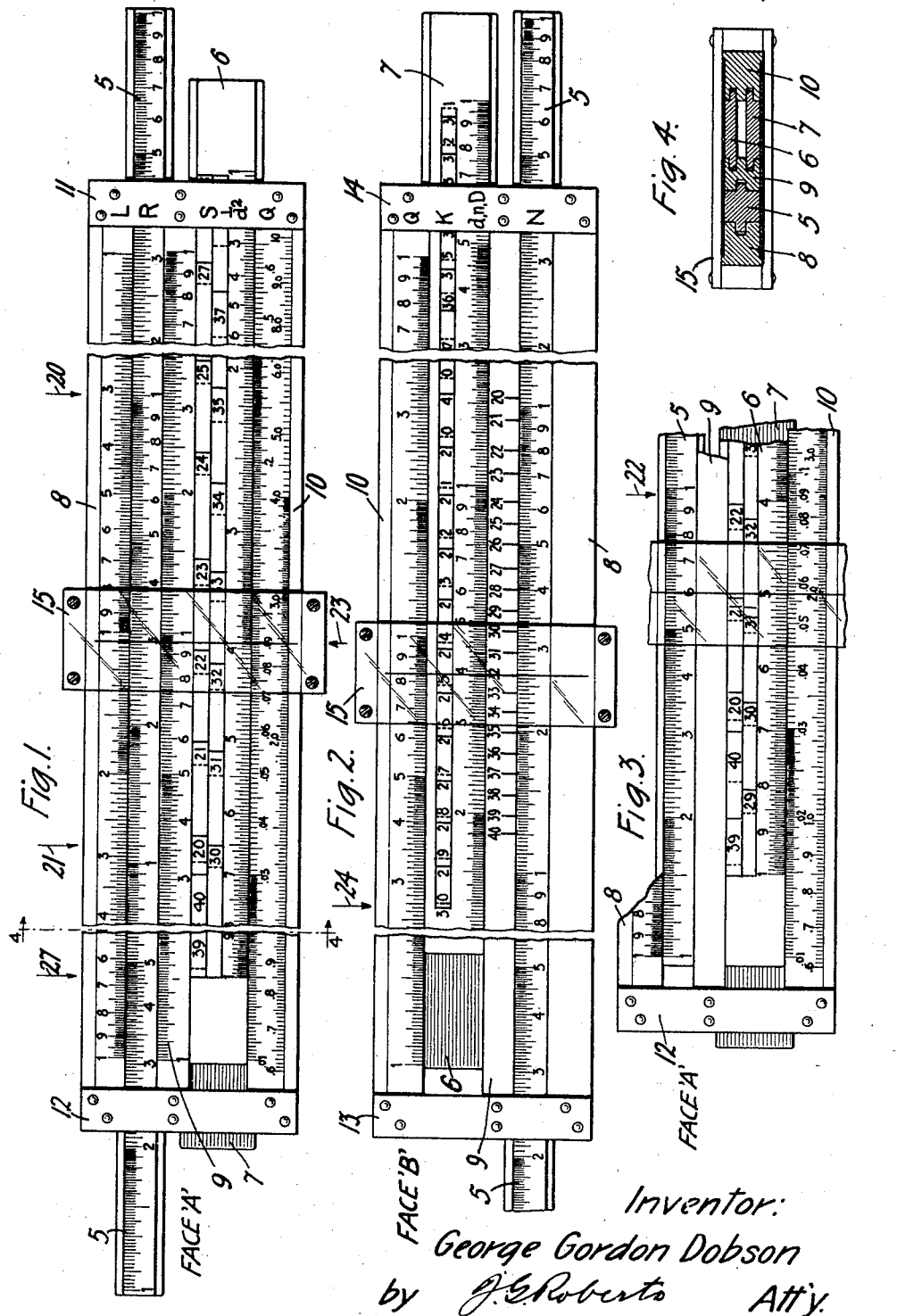

GEORGE G. DOBSON, OF PASSAIC, NEW JERSEY, ASSIGNOR TO WESTERN ELECTRIC COMPANY, INCORPORATED, OF NEW YORK, N. Y., A CORPORATION OF NEW YORK.

NUMERICAL CALCULATING DEVICE.

1,426,825.     Specification of Letters Patent.     Patented Aug. 22, 1922.

Application filed January 2, 1918. Serial No. 209,965.

*To all whom it may concern:*

Be it known that I, GEORGE GORDON DOBSON, a citizen of the United States, residing at Passaic, in the county of Passaic, State of New Jersey, have invented certain new and useful Improvements in Numerical Calculating Devices, of which the following is a full, clear, concise, and exact description.

This invention relates to a numerical calculating device and is more particularly described as a slide rule.

An object of this invention is to provide a device of this class for the direct solution of problems involving second degree equations.

A further object is to provide a device for obtaining winding calculations directly, such as computations relating to the winding of filamentary material on spools, or the like.

Although this invention will be hereinafter described as especially adapted to the computations relating to the winding of conductors on spools to form relay coils, for example, it is to be understood that it is not so limited, since it has wide application, as will be apparent from the detailed description and drawings. For the purpose of this specification, the phrase, "filamentary material," will be employed to be broadly descriptive of material made in any such form as that of a cord, thread, wire, strand, ribbon, rope, string and the like.

In manufacturing spools having a conductor wound thereon, it is desirable to previously determine various data before actually performing the winding of the conductor, such as, for example, determining how many layers of wire of a given size may be wound on a certain size spool, or what size of wire should be employed to give a specified resistance when the spool is wound full, and other such calculations.

Assume that it is desired to wind a wire of a given size upon a spool having a length $L$ and a depth $D$ available for winding on a core of diameter $d$.

If $N$ be the total number of turns of wire having a resistance $r$ per unit length that may be wound on this spool, then the total resistance $R$ of $N$ number of turns would be $$R = N r \pi (D + d) \quad (1)$$

If we call by $K$, the cross sectional area actually required for one turn, then we may write the above expression as $$R = \frac{L D \pi r}{K}(D + d)$$

since $$K = \frac{LD}{N}$$

If we call $$\frac{\pi r}{K} = S$$

then $$R = LDS(D + d)$$

which may be written $$\frac{R}{LS} = D^2 + Dd$$

and since $$D = \frac{NK}{L}$$

$$\frac{R}{LS} = \frac{N^2 K^2}{L^2} + \frac{NKd}{L}$$

dividing this by $d^2$ we obtain $$\frac{R}{LSd^2} = \frac{N^2 K^2}{L^2 d^2} + \frac{NK}{Ld}$$

If we call $$\frac{NK}{dL} = Q$$

then $$\frac{R}{LSd^2} = Q^2 + Q = Q(Q + 1)$$

and then if we call $$\frac{R}{LSd^2} = Q'$$

then we will have $$Q' = Q(Q + 1)$$

If it be desired, for example, to determine the value of $N$, the method to be followed would be to find first the value of $Q'$, assuming the values of $R$, $L$, $S$ and $d$ to be known. Having found the value of $Q'$, it is then necessary to find Q by solving the quadratic equation $$Q' = Q(Q+1)$$

Knowing Q, N may then be obtained from the expression $$N = \frac{QdL}{K}$$

For some of the calculations in regard to winding coils, it has been found convenient to employ a single expression $c$ for the ratio $\frac{D}{n}$ where D is the depth of the winding of the spool and $n$ the number of layers of a given size of material that may be wound thereon. For example, if we have given the number of layers desired and know the dimensions of the spool and the size of wire desired, we may obtain the total resistance the wire would have by first finding the value of Q from the expression $$Q = \frac{cn}{d}$$

That this expression is true may be seen from the fact that $$Q = \frac{NK}{dL} = \frac{D}{d} = \frac{cn}{d}$$

Then by finding the value of Q' from the equation $$Q' = Q(Q+1)$$

the value of R may be obtained from $$Q' = \frac{R}{LSd^2}$$

which may be rewritten $$R = Q'LSd^2$$

By employing the above equation any unknown quantity may be determined, providing the values of the others are known. This will be better understood by reference to the drawings, which illustrate a slide rule constructed according to this invention and which in Fig. 1 illustrates one face of the rule; Fig. 2 illustrates the reverse side; Fig. 3 illustrates how the rule may be set for the solution of quadratic equations; and Fig. 4 is a cross-sectional view of the rule.

Referring to Figs. 1 and 2, it will be seen that the slide rule illustrated therein has three slides 5, 6 and 7, which work in suitable grooves in the framework of the rule comprising the bars 8, 9 and 10 which are held together by cross pieces 11, 12, 13 and 14. 15 is the runner for the slide rule.

Referring particularly to Fig. 1, which shows one face A of the rule, on the bar 8 are two ordinary inverted logarithmic scales set end to end and marked L on the cross piece 11. On the slide 5, and marked R, are shown three logarithmic scales set end to end and each of the same length as the scales marked L. On the bar 9 are two logarithmic scales similar to each other set end to end. On the upper bar of slide 6 are values of S plotted according to their logarithmic values which may be marked as shown in terms of the size of wire for the various values. On the lower part of the slide 6 is an inverted logarithmic scale and of a length double that of the logarithmic scales shown on either scale R or L and marked $\frac{1}{d^2}$ on the cross piece 11. On the bar 10 is a scale showing values of Q which correspond to values of $Q(Q+1)$ on the logarithmic scale R.

Referring to Fig. 2, which is the reverse side of the rule and which we may call face B the bar 10 is shown to have two logarithmic scales set end to end and marked Q. On the upper side of slide 7 is an inverted scale marked K which represents various values of K plotted according to their logarithmic values and marked as shown in terms of the size of wire for the various values on a logarithmic scale of length equivalent to the scale length of Q. On the lower side of the slide 7 are two ordinary logarithmic scales set end to end and marked $d$, $n$, D. The bar 9 has on it a scale of values of $c$ expressed in terms of size of wire and plotted according to their logarithmic values on this scale so that for any size of wire the value of $c$ for it will appear on scale Q opposite its number on scale $c$. Slide 5 has on it three logarithmic scales set end to end and marked N. It is to be noted that the slide 5 is a so-called "duplex" slide and has a scale on both faces of the rule so that setting the slide on one side automatically sets it on the other.

As an example of the method to be followed in employing this slide rule for calculations, the slides in the Figs. 1 and 2 are shown to be set for a calculation for the number of turns N of No. 30 wire having a total resistance R of 1100 ohms that may be wound on a spool having a cylindrical core of diameter $d$ 0.395 inches, and winding length L of 3.1 inches.

We have given $$Q(Q+1) = Q' = \frac{R}{Sd^2L}$$

and we are to find the value of Q from such equation, and then knowing Q to solve for N, given that $$N = \frac{QdL}{K}$$

The first step, therefore, is to find the value of the expression $$\frac{R}{Sd^2L}$$

which is equal to Q'. To do this, following the data above given, we shall divide R sequentially by the values of L, S and $d^2$.

To divide R, which has the value of 1100, by L, which is equal to 3.1, remembering that scale L is an inverted scale, unity on scale R (preferably the third unity from the left) is set opposite the value of L on scale L as is shown at arrow mark 20 (Fig. 1). The value, therefore, on the scale on bar 9 opposite 1100 on R, is approximately 355 (under arrow mark 21) which is the result of the division of 1100 by 3.1.

The next step is then to divide 355 by the value of S. The logarithm of the value of S for No. 30 wire should then be subtracted from the logarithm of 355. This may be accomplished as shown at arrow-point marked 21, by setting the No. 30 on slide 6 of scale S under 355 on scale 9 and reading off at arrow mark 27 the result, namely, 1.52, which is opposite to unity on scale S.

We now have to divide 1.52 by the value of $d^2$ which is the square of .395. Since the scale marked $\frac{1}{d^2}$ is an inverse scale and is of double the length of the scales on bar 9, the division may be accomplished on scale $\frac{1}{d^2}$ by performing the operation as if we were multiplying 1.52 by $(.395)^2$. We then set unity on scale $\frac{1}{d^2}$ (which setting in this case has been previously made) under 1.52 on scale 9 and read off the value 9.75 on scale 9 which is opposite .395 on scale $\frac{1}{d^2}$, which setting is shown at position 23 of the runner. We have, therefore, divided R by L, S and $d^2$, and have obtained the value 9.75 which then is the value of Q'. And since each value $x$ on scale Q corresponds to $x(x+1)$ on an ordinary scale as scale 9, then since $Q'=Q(Q+1)$, the value 2.66 on the lower part of scale Q which corresponds to 9.75 on scale 9 is the value of Q which is desired. It is to be noted that scale Q is a double scale and whether the result is to be read on the upper or lower portion depends upon the position of the decimal point in the value of Q'.

The above method of finding the value of Q' is longer than need be in actual practice. For example, the scale on bar 9, face A, may be omitted if desired, and the following operations are all that are necessary to obtain the value of Q: (1) set the third unity from the left on scale R under the value of L, 3.1, on scale L; (2) set the value of S, No. 30, (full line) on scale S under the value of R 1100 on scale R; (3) read off the value of Q under the value of $\frac{1}{d^2}$ 0.395 on scale $\frac{1}{d^2}$, thereby arriving at the same result given above.

Now referring to face B, Fig. 2, we proceed to solve for N, knowing that $$N=\frac{QdL}{K}$$

and knowing that the setting of duplex slide 5 previously performed has already introduced the multiplier L. We then must multiply Q by $d$ and divide the result by K in order to obtain the value of N. We therefore must set No. 30 on scale K (full line) under 2.66 on scale Q, face B, shown at arrow mark 24 and read off the value of N under 0.395 on scale $d$, which gives us for N a value of approximately 26,400 turns.

It is to be noted that each slide is set only once in the operation of finding the value of N so that the result may be quickly checked by retracing with the runner the various steps performed without a single resetting of any portion of the rule,—a very important advantage in calculations involving several steps such as the above.

The particular setting of the slides shown above also may be employed to find the value of R, for example, knowing that N equals 26,400. The steps outlined above would be retraced backwards until the value of Q on face B was found to be 2.66. Then setting the hair on the runner on 2.66 on bar Q, face A, and multiplying by S, $d^2$, and L, the value of R, namely 1100, would be obtained. Other values that were unknown could be calculated similarly, such as to find the size of wire to be employed or the value of various other data.

In the actual employment of this slide rule in the designing of relay coils to which it is particularly adapted, a somewhat more complicated process should preferably be followed in order to insure the best checking of the results. As the wire employed may vary somewhat in its supposed diameter, it has been found preferable, to facilitate this checking, to plot the values of the constants K and S, both for the maximum diameter each given standard gauged wire may have and also for the minimum diameter each may have. In the drawings, the full line scale for S and K represents values for the minimum diameter each standard gauged wire may have, while the dotted line scale for these constants represents values calculated from the maximum diameter.

Thus if we employ the dotted line values of S and K in such calculations as outlined above we will obtain the minimum values of N and R for a given size of standard gauged wire. On the other hand the use of the full lines will give the maximum values for R and N. As an example of the use of the dotted line scales, suppose we have given the resistance and the size of wire to be wound on a certain spool to test for fullness, that is to test whether such a size of wire with the required resistance will demand more than the available winding space on the spool. The value of Q, face A of the rule, would be found in the way described above under the calculation of N, with the exception that the dotted scale of S would be employed. Setting the value of Q thus obtained on scale Q face B, we may solve for D, the depth such a winding would have, since Q$d$=D. We may compare the value of D thus obtained with the depth dimension of the spool to ascertain if the spool is "over full" or not. Since as stated above, the dotted line scale of, S should be employed, the depth of the winding obtained will be the maximum value for the given size wire or in other words the value of D thus obtained is the greatest possible since it is calculated under the most adverse condition of maximum diameter of the wire.

In the above examples, it may be noted that all the scales of both sides of the rule were employed in the calculations, excepting the slide marked $c$, on face B.

In order to illustrate a case in which the slide $c$ may be employed, suppose that the dimensions of the spool and the size of the wire are given to find the values of N and R. In order to find the number of layers $n$, that may be wound, we may use the expression $$\frac{D}{c} = n.$$

Knowing $n$, $c$ and $d$, we then may find Q by the expression $$Q = \frac{cn}{d},$$

the value of which may be read off on scale Q, face B. Setting this value on scale Q, face A, and multiplying it by $d^2$ and by S, the value of R may be obtained. The value of N may then be obtained as in the first example outlined above.

Fig. 3 illustrates the general use that may be made of scales R and Q, face A, in the solution of quadratic equations of the form $x^2+x=b$ where $b$ is a constant. The scales R and Q provide means whereby such an equation may be solved, since for various values of $(x^2+x)$ on scale R, the corresponding values of $x$ have been plotted on scale Q. Therefore, if it is desired to solve a quadratic equation, say $x^2+x=6$, for example, then by setting the initial point on the two scales opposite each other, as shown in Fig. 3, the value on scale Q opposite to 6 on R will be found to be 2. The value of $x$ in the above equation is therefore 2.

An equation of the form $x^2+ax=b$, where $a$ is a constant, may be also solved since it may be written in the form $$\frac{x^2}{a^2}+\frac{x}{a}=\frac{b}{a^2}$$

Now if we call $y=\frac{x}{a}$ and call $K=\frac{b}{a^2}$ then the above equation becomes $y^2+y=K$, which is in the same form as the equation given previously. Setting the value of K on R, the corresponding value of $y$ may be found on the scale Q and then knowing the value of $y$, the value of $x$ may be determined.

It is apparent that the method applied above may be employed for the solution of still higher degree equations by the suitable plotting of the scale marked Q. Thus the solution of a cubic equation of the form, say $x^3+x^2+x=a$, may be solved if the various values of $x$ on scale Q should be plotted against the corresponding values of $x^3+x^2+x$ on a logarithmic scale, such as scale R. Similarly equations of the general form $ax^3+bx^2+cx=f$ may be solved.

Fig. 4 is a cross sectional view of the rule taken along the plane marked 4, 4 in Fig. 1 and illustrates how the slides 5, 6 and 7 may be suitably engaged in grooves in the bars 8, 9 and 10 which form the framework of the rule.

It is to be understood that this invention is not limited to the particular arrangement of scales as shown in the drawing, but that they may be suitably modified to conform with the particular form of calculation desired without departing in anywise from the spirit of this invention as defined in the appended claims.

It is to be noted from the above detailed description that face A of the slide rule is adapted to solve equations of the general form.

$$x=\frac{A}{\overline{BCD^2}}$$

with only one resetting; and that face B is adapted to solve an equation of the form $$x=\frac{ABC}{D}$$

without a single resetting. It is obvious that this rule may be adapted to solve equations of these two types where the values of A, B, C, and D may vary within limits other than those chosen for the particular scales described.

What is claimed is:

1. A slide rule for the solution of a problem involving a number of variables, at least one of which is unknown, said rule comprising a body, a duplex slide and an additional slide, scales on said body and said slides representing said variables, whereby said scales are adapted to cooperate for the determination of an unknown variable when values of other variables involved in said problem are known, one scale on each side of said body being a logarithmic scale, the scales on both sides of said duplex slide being logarithmic scales.

2. A slide rule for the solution of a problem involving a number of variables, at least one of which is unknown, said rule comprising a body and more than two slides, one of said slides being a duplex slide, logarithmic scales on said body and each of said slides, each of said scales representing one of said variables whereby said scales are adapted to cooperate for the determination of an unknown variable when the values of the other variables involved in said problem are known.

3. A slide rule for the solution of a problem relating to the winding of a filamentary material on a spool involving such quantities as the dimensions of the spool, the size and resistance of the filamentary material, and the number of turns of said material which may be wound on said spool within the space allowed, said rule comprising a body and a plurality of slides, one of which is a duplex slide, logarithmic scales on said body and said slides representing said quantities whereby said scales are adapted to cooperate for the determination of one of said quantities which is unknown when the values of other of said quantities involved in the problem are known, said scales being so arranged on said slides and said body that the problem may be solved without the resetting of any one of said slides.

In witness whereof, I hereunto subscribe my name this 28th day of December A. D., 1917.

GEORGE G. DOBSON.